(12) United States Patent
Crossman et al.

(10) Patent No.: US 7,415,903 B2
(45) Date of Patent: Aug. 26, 2008

(54) METHOD AND SYSTEM FOR AN IMPACT SLED FOOTWELL INTRUSION TEST

(75) Inventors: Mark W. Crossman, Oakland Township, MI (US); Wahaj Ahmed, Dearborn, MI (US); Roger A. DeWulf, Macomb, MI (US); Meraj Ahmed, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 129 days.

(21) Appl. No.: 11/615,335

(22) Filed: Dec. 22, 2006

(65) Prior Publication Data
US 2008/0148878 A1    Jun. 26, 2008

(51) Int. Cl.
*G01N 17/00*     (2006.01)
*G01M 19/00*     (2006.01)

(52) U.S. Cl. .................................... 73/866.4; 73/865.6
(58) Field of Classification Search ............... 73/865.6, 73/866.4, 121; 280/784; 180/274; 296/187.03
See application file for complete search history.

(56) References Cited

U.S. PATENT DOCUMENTS

| | | | | |
|---|---|---|---|---|
| 4,893,579 | A | 1/1990 | Kobayashi | 114/363 |
| 4,945,852 | A | 8/1990 | Kobayashi | 114/363 |
| 5,193,640 | A | 3/1993 | Lee | 180/271 |
| 5,695,242 | A | 12/1997 | Brantman et al. | 297/216.1 |
| 5,705,744 | A | 1/1998 | Brugger et al. | 73/121 |
| 5,813,600 | A | 9/1998 | Straub | 236/49.3 |
| 5,954,577 | A | 9/1999 | Meckler | 454/75 |
| 6,010,870 | A | 1/2000 | Pelzer et al. | 435/41 |
| 6,135,047 | A | 10/2000 | Miller | 114/343 |
| 6,141,603 | A | 10/2000 | Greenhill | 700/245 |
| 6,158,766 | A | 12/2000 | Kowalski | 280/730.1 |
| 6,224,095 | B1 | 5/2001 | Schifflechner et al. | 280/735 |
| 6,234,569 | B1 | 5/2001 | Derleth et al. | 296/208 |
| 6,269,900 | B1 | 8/2001 | Adams et al. | 180/274 |
| 6,286,867 | B1 | 9/2001 | Braemig et al. | 280/784 |
| 6,336,653 | B1 | 1/2002 | Yaniv et al. | 280/730.1 |
| 6,354,171 | B1 | 3/2002 | Wolpert et al. | 74/512 |
| 6,513,616 | B2 | 2/2003 | Bacher et al. | 180/268 |

(Continued)

FOREIGN PATENT DOCUMENTS

WO    WO 9913311 A1 *   3/1999

OTHER PUBLICATIONS

"Simulation Of Foot Well Intrusion For Sled Testing" Martin Thelen, Ralf Raffauf, Winfried Buss, Willi Roth and Klaus Hillenbrand, PARS, Passive Rückhaltesysteme GmbH Germany, Paper No. 98-S1-O-10, pp. 242-244.

(Continued)

*Primary Examiner*—Hezron E. Williams
*Assistant Examiner*—Tamiko D Bellamy
(74) *Attorney, Agent, or Firm*—Ralph E. Smith

(57) ABSTRACT

The present invention provides a system and a method to enhance HYGE impact simulator sled testing, enabling more accurate measurements of lower leg injury criteria and providing a more accurate restraint system evaluation during a HYGE impact simulator test. The system provides the generation of both rotational and translational footwell intrusion, replicating an actual barrier crash impact test. The rotational and translational footwell intrusion includes foot motion; lower leg motion, including various forces and moments; and knee motion, including interaction with the instrument panel.

15 Claims, 6 Drawing Sheets

U.S. PATENT DOCUMENTS 6,850,921 B1    2/2005    Becker et al. ................ 706/12
6,880,475 B1    4/2005    Thompson .............. 114/55.55

OTHER PUBLICATIONS

ADRIA PL96-1074, Final Report For Publication, TNO Crash Safety Research Centre (TNO); Partners: Eindhoven University of Technology (TUE), Institute National de Recherché sur les Transports et leur Securite (INRETS), Polytechnical University of Madrid (UPM), Transport Research Centre (TRL), University of Heidelberg (UNH), TNO Crash Safety Research Centre (TNO); Reference Period Jan. 2, 1997 to Jan. 6, 1999; Date: Jan. 10, 2000; pp. —Cover, 85, 86.

* cited by examiner

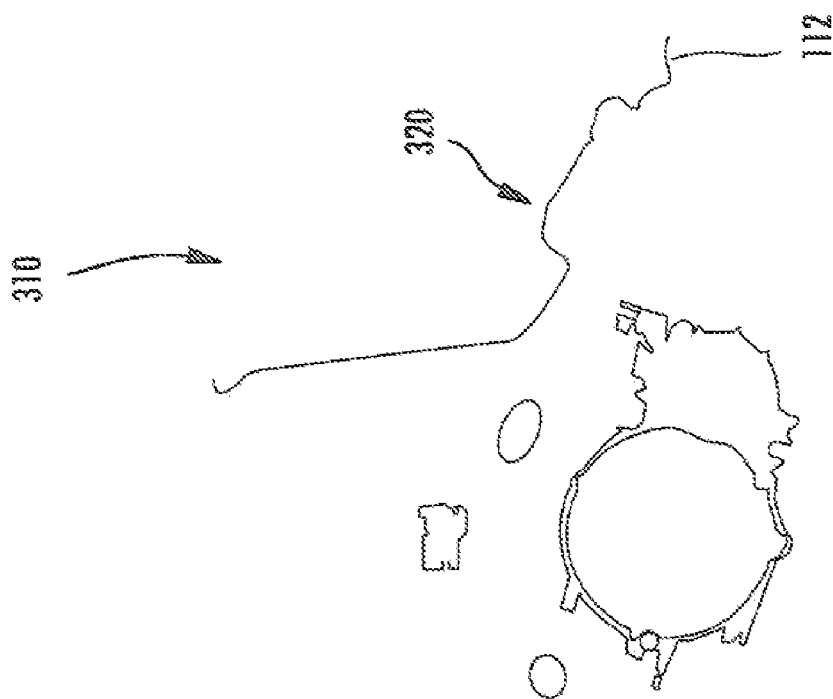
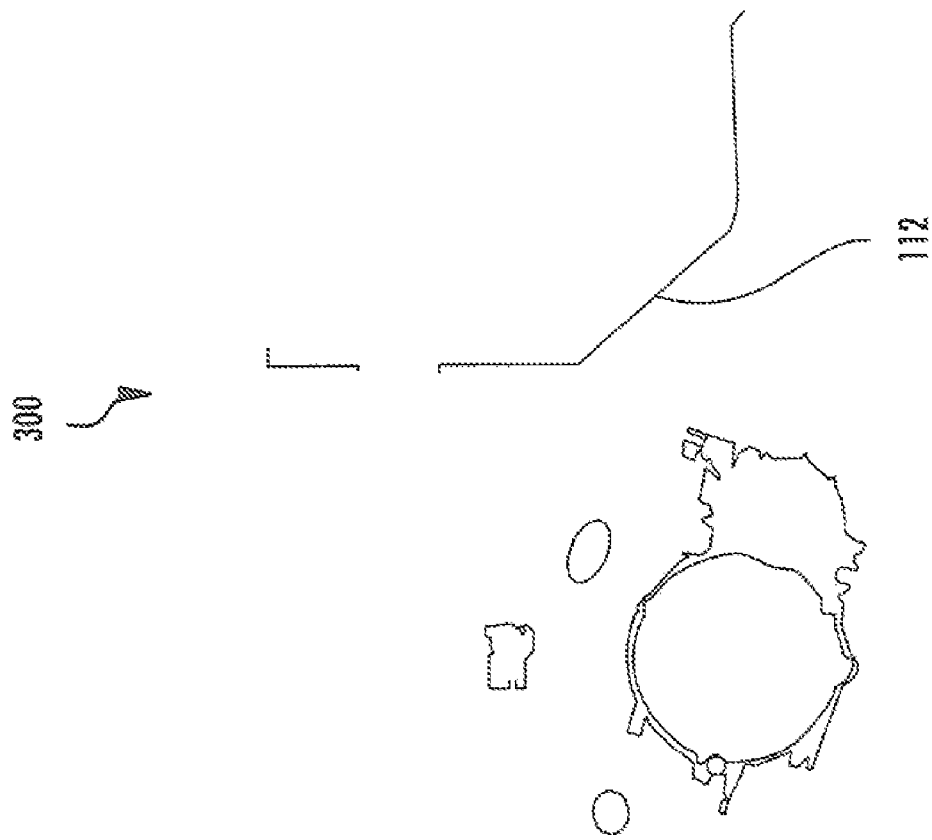

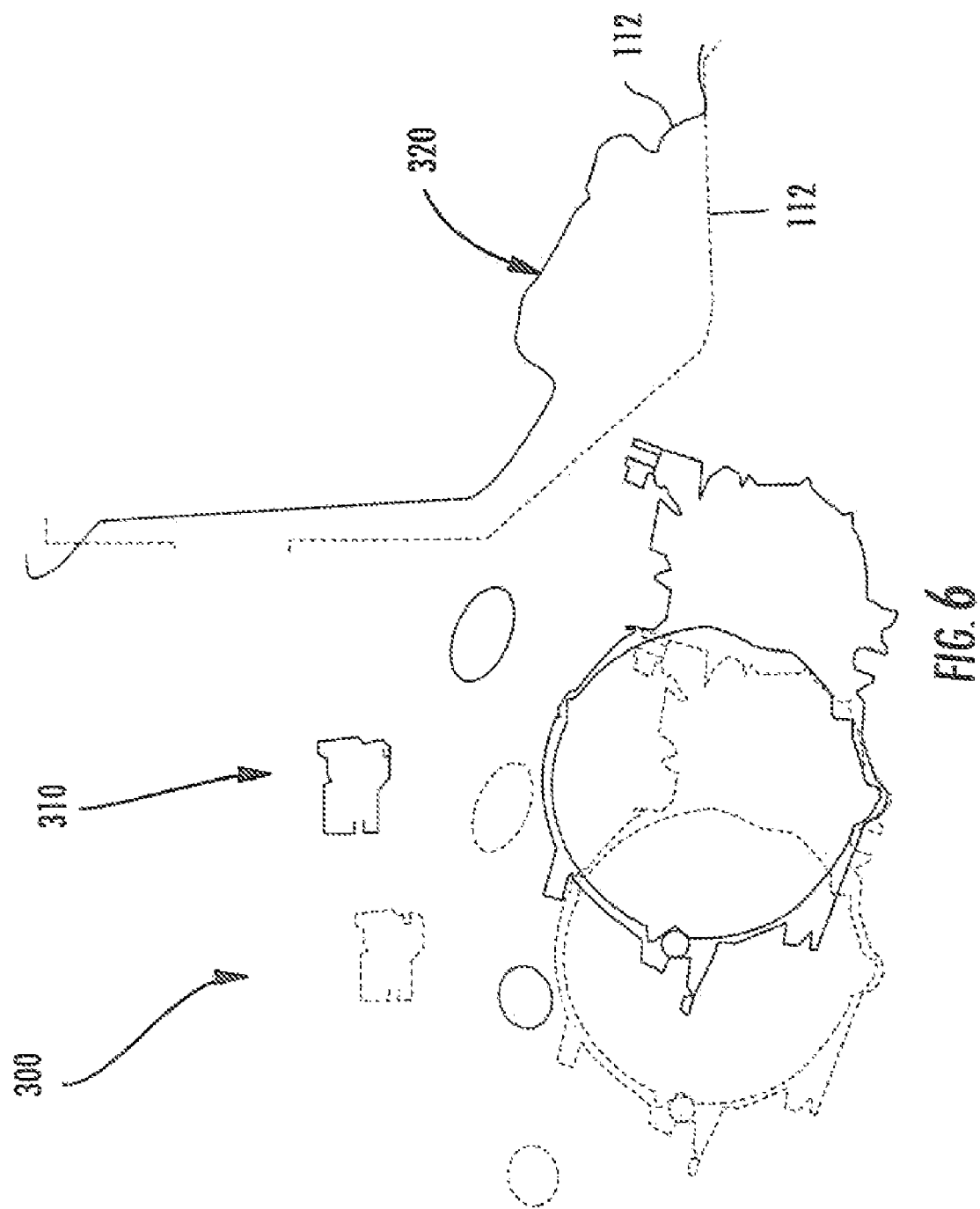

METHOD AND SYSTEM FOR AN IMPACT SLED FOOTWELL INTRUSION TEST

FIELD OF THE INVENTION

The present invention relates generally to vehicle crash impact testing techniques. More specifically, the present invention relates to a system and a method that enhance hydraulically controlled, gas energized (HYGE) impact simulator sled testing to enable more accurate lower leg injury criteria by generating both rotational and translational footwell intrusion.

BACKGROUND OF THE INVENTION

In a severe frontal vehicle crash impact, there is often intrusion into the footwell region of the vehicle. Such intrusion may result in severe lower leg injury to the driver or a front passenger. To better manufacture vehicles to shield against such an impact, automobile manufacturers conduct a broad range of barrier crash tests when developing a vehicle for production. In many of these tests, requirements exist for anthropomorphic test device (ATD, also known as a "test dummy") leg values. For example, the tibia index is the primary lower leg measurement used to predict lower leg injury. The tibia index is an interaction formula that includes both axial forces and moments. The tibia index is used to predict damage to an actual human tibia.

Test device leg values are difficult to accurately assess in conventional testing equipment known in the art. For example, with the traditional HYGE crash simulation sled test, lower leg values are difficult to assess because the HYGE system is a non-intrusion environment. Thus, with a HYGE system, there is no intrusion into the footwell region. Although a traditional HYGE test is suitable for analysis measurements about the head and chest areas, the HYGE test is ill-suited for lower leg analysis. Additionally, lower leg values also are difficult to assess with computer aided engineering (CAE) due to the limited fidelity in the MADYMO (design and crash simulation software) test manikin. Although CAE analysis includes footwell rotational and translational motion, the MADYMO test manikin does not accurately measure lower leg values. Thus, the simulation tools that are currently available for impact sled testing, such as CAE and traditional HYGE testing, cannot meaningfully assess lower extremity injury criteria.

BRIEF SUMMARY OF THE INVENTION

In various exemplary embodiments, the present invention provides a system and a method to enhance HYGE impact sled testing, enabling more accurate measurements of lower leg injury criteria and providing a more accurate restraint system evaluation during a HYGE impact simulator test. The system provides the generation of both rotational and translational footwell intrusion, replicating an actual barrier crash impact test. The rotational and translational footwell intrusion includes foot motion; lower leg motion, including various forces and moments; and knee motion, including interaction with the instrument panel.

In one exemplary embodiment, the present invention provides a system for impact simulator testing in the footwell region of a vehicle. This system enables more accurate lower leg injury criteria measurements by generating footwell intrusion. The system includes a sled buck; a footrest plant located on the sled buck; a pivot hinge located at the base of the footrest plane and upon which the footrest plant pivots; a slide plane allowing horizontal motion on the floor of the sled buck; a compressed fluid tank; a first timer-released solenoid valve fluidly coupled to the compressed fluid tank; a second timer-released solenoid valve fluidly coupled to the compressed fluid tank; a first piston-cylinder fluidly coupled to the first inner-released solenoid valve; a second piston-cylinder fluidly coupled to the second timer-released solenoid valve; and a translational force block, upon which, when actuated, the second piston-cylinder places a horizontal force, and with which the translational force block is moved horizontally into the footrest plane. A rotational motion is generated by a fluid flow from the compressed fluid tank to the first piston-cylinder, being actuated by the first timer-released solenoid valve and moving horizontally into the footrest plane, thereby creating the rotational motion to the footrest plane. A translational motion is generated by a fluid flow from the compressed fluid tank to the second piston-cylinder, being actuated by the second timer-released solenoid valve and creating the translational motion by moving the translational force block horizontally along the slide plane to the footrest plane. The system is coupled to a hydraulically controlled, gas energized impact simulator sled test. The system also includes an anthropomorphic test device. The anthropomorphic test device is used to measure lower extremity accelerations, forces, and moments during the vehicle crash impact test. The system also includes one or more stops. The one or more stops control the magnitude of the motion simulating footwell intrusion. The magnitude of the rotational motion is stopped at a predetermined level. The magnitude of the translational motion is also stopped at a predetermined level. The compressed fluid tank is pressure adjusted such that a pressure level in the compressed fluid tank is adjusted to mimic the rate of footwell intrusion during an actual barrier crash. The first and second timer-released solenoid valves each are actuated at a unique predetermined time, to better mimic actual footwell intrusion. The first timer-released solenoid valve includes a first orifice that is adjustable, controlling the rate of mass transfer from the compressed fluid tank to the first piston-cylinder. The second timer-released solenoid valve includes a second orifice that is also adjustable, controlling the rate of mass transfer from the compressed fluid tank to the second piston-cylinder.

In another exemplary embodiment, the present invention provides a method for impact simulator testing in the footwell region of a vehicle. The method enables more accurate lower leg injury criteria measurements by generating footwell intrusion. The method includes providing a sled buck; providing a footrest plane located on the sled buck; providing a pivot hinge located at the base of the footrest plane and upon which the footrest plane pivots; providing a slide plane allowing horizontal motion on the floor of the sled buck; providing a compressed fluid tank; providing a first timer-released solenoid valve fluidly coupled to the compressed fluid tank; providing a second timer-released solenoid valve fluidly coupled to the compressed fluid tank; providing a first piston-cylinder fluidly coupled to the first timer-released solenoid valve; providing a second piston-cylinder fluidly coupled to the second timer-released solenoid valve; and providing a translational force block, upon which, when actuated, the second piston-cylinder places a horizontal force, and with which the translational force block is moved horizontally into the footrest plane. A rotational motion is generated by a fluid flow from the compressed fluid tank to the first piston-cylinder, being actuated by the first timer-released solenoid valve and moving horizontally into the footrest plane, thereby creating the rotational motion to the footrest plane. A translational motion is generated by a fluid flow from the compressed fluid tank to the second piston-cylinder, being actuated by the second timer-released solenoid valve and creating the translational motion by moving the translational force block horizontally along the slide plane to the footrest plane. The method also provides use coupled with a hydraulically controlled, gas energized impact simulator sled test. The method also includes providing an anthropomorphic test device. The anthropomorphic test device is used to measure lower extremity accelerations, forces, and moments during the vehicle crash impact test. The method also includes providing one or more stops. The one or more stops controls the magnitude of the motion simulating footwell intrusion. The magnitude of the rotational motion is stopped at a predetermined level. The magnitude of the translational motion is also stopped at a predetermined level. The compressed fluid tank is pressure adjusted such that a pressure level in the compressed fluid tank is adjusted to mimic the rate of footwell intrusion during an actual barrier crash. The first and second timer-released solenoid valves each are actuated at a unique predetermined time, to better mimic actual footwell intrusion. The method also provides that the first timer-released solenoid valve includes a first orifice that is adjustable, controlling the rate of mass transfer from the compressed fluid tank to the first piston-cylinder. The method also provides that the second timer-released solenoid valve includes a second orifice that is also adjustable, controlling the rate of mass transfer from the compressed fluid tank to the second piston-cylinder.

In yet another exemplary embodiment, the present invention provide a method for impact simulator testing in the footwell region of a vehicle to enable more accurate lower leg injury criteria measurements by generating footwell intrusion including providing a first actuation apparatus and providing a second actuation apparatus. The first actuation apparatus selectively imparts a rotational motion. The second actuation apparatus selectively imparts a translation motion. The rotational motion and the translational motion generate footwell intrusion in the footwell region of the vehicle.

Advantageously, the present invention enhances HYGE impact sled testing, enabling more accurate lower leg injury criteria by generating both rotational and translational footwell intrusion. The system and method enable design and impact engineers to define vehicle parameters for optimal crashworthiness, such as footrest location, footrest angle, instrument panel and kneeblocker placement, and maximum allowable footwell intrusion. Also, advantageously, this system and method will provide outputs such as the tibia index for lower leg evaluation and other ATD indicators used in traditional HYGE sled testing.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following description of an exemplary embodiment which is illustrated in the accompanying drawings.

BRIEF DESCRIPTION OF THE DRAWINGS

The present invention is illustrated and described herein with reference to the various drawings, in which like reference numbers denote like system components and/or method steps, respectively, and in which:

FIGS. 5a and 5b are both left sectional views an automobile powertrain and dash panel used in an impact test, shown in both original and deformed states, respectively; and FIG. 6 is an overlay diagram of FIG. 5b overlaid upon FIG. 5a, illustrating the movements and deformity of the powertrain and dash panel and showing the impact to the footrest plane and the footwell region.

DETAILED DESCRIPTION OF THE INVENTION

Figure 1:
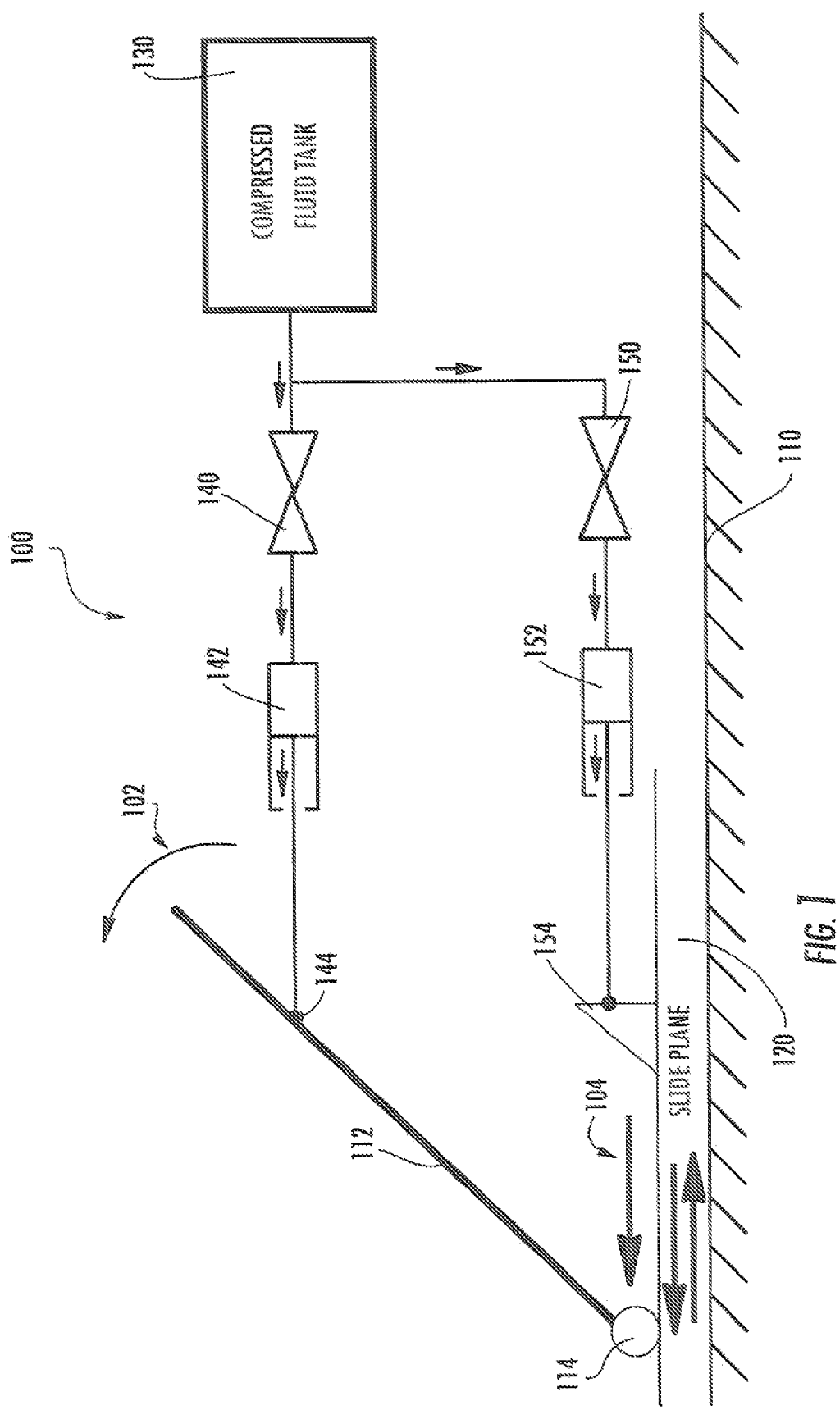
FIG. 1 is a schematic diagram of a system that enhances impact sled testing to enable more accurate lower leg injury criteria, according to an embodiment of the present invention.

Referring to FIG. 1, the present invention provides a footwell intrusion test 100 to enhance HYGE impact sled testing, enabling more accurate measurements of lower leg injury criteria and providing a more accurate restraint system evaluation during a HYGE impact simulator test. The footwell intrusion test 100 provides for the generation of both rotational 102 and translational 104 footwell intrusion, replicating an actual barrier crash impact test. The rotational 102 and translational 104 footwell intrusion includes foot motion; lower leg motion, including various forces and moments; and knee motion, including interaction with the instrument panel.

The footwell intrusion test system 100 enhances vehicle impact sled testing to enable more accurate lower leg injury criteria by generating both rotational and translational footwell intrusion. The footwell intrusion test system 100 includes a sled buck 110; a footrest plane 112, located on the sled buck 110; and a pivot hinge 114, located at the base of the footrest plane 112 and upon which the footrest plane 112 pivots. The footrest plane 112 is a substantially planar surface formed from a rigid material that is disposed at an angle to the sled buck 110 and mounted to the pivot hinge 114.

The footwell intrusion test system 100 also includes a slide plane 120. The slide plane 120 is a substantially planar surface formed from a rigid material that is disposed substantially parallel to the sled buck 110. The slide plane 120 allows a horizontal rearward motion on the sled buck 110. The footrest plane 112 and pivot hinge 114 are mounted to the floor of the sled buck 110 on the slide plane 120. The footrest plane 112, pivot hinge 140, and translational force block 154 move during the impact test due to motion imparted by the pressurized fluid, as driven by both the first and second piston-cylinders 142, 152.

The footwell intrusion test system 100 also includes a compressed fluid tank 130, a first timer-released solenoid valve 140, and a first piston-cylinder 142. The system 100 produces a rotational motion 102 that is generated by a fluid flow hydraulically expressed from the compressed fluid tank 130. The fluid in the compressed fluid tank 130 is oil, water, air, or any other fluid that is suitable for providing sufficient fluid pressure to the first piston-cylinder 142 and the second piston-cylinder 152. The fluid flow from the compressed fluid tank 130 to the first piston-cylinder 142 is actuated by first timer-released solenoid valve 140. Once the first timer-released solenoid valve 140 actuates the fluid flow, the first piston-cylinder 142 is moved horizontally into the back of the footrest plane 112 at a point of actuation 144 for rotational motion 102. The force on the back of the footrest plane 112 from the first piston-cylinder 142 creates a rotational motion 102. The rotational motion 102 pivots the footrest plane 112 about the pivot hinge 114, thereby creating the rotational motion 102 to the footrest plane 112 and simulating footwell intrusion.

The footwell intrusion test system 100 also includes a second timer-released solenoid valve 150, a second piston-cylinder 152, and a translational force block 154. The fluid flow from the compressed fluid tank 130 to the second piston-cylinder 152 is actuated by the second timer-released solenoid valve 150. Once the second timer-released solenoid valve 150 actuates the fluid flow, the second piston-cylinder 152 is moved horizontally into the translational force block 154. The translational force block 154 is horizontally pushed along the slide plane 120 to the footrest plane 112. The force on the back of the footrest plane 112, near the pivot hinge 114, creates a translational motion 104. The translational motion 104 creates a force into the back of the footrest plane 112, near the pivot hinge 114, thus providing additional simulated footwell intrusion.

The footwell intrusion test system 100 also includes one or more system stops (not shown). A system stop controls the magnitude of the motion simulating footwell intrusion. For example, a system stop on the rotational force controls the magnitude of the rotational motion 102 and stops the rotations of the footrest place 112 at a predetermined level. Likewise, a system stop on the translational force controls the magnitude of the translational motion 104 and stops the displacement of the footrest place 112 at a predetermined level. The stop is, for example, but not limited to, a strap used to limit the movement of the footrest plane 112. Optionally two straps are used: one strap for limiting rotational motion 102, and one strap for limiting translational motion 104. Such straps do not limit the force or impact, but rather limit the movement of the footrest plane 112.

The footwell intrusion test system 100 also provides that the compressed fluid tank 130 is pressure adjusted. As such a pressure level in the compressed fluid tank 130 is adjusted to mimic the rate of footwell intrusion during an actual barrier crash.

The footwell intrusion test system 100 also provides that the first and second timer-released solenoid valves 140, 150 each are actuated at a unique predetermined time, to better mimic actual footwell intrusion. Such a predetermined time is determined based on simulation data, such as CAE data. The CAE model can predict dynamic motion, illustrating displacement over time. For example, deformation can be modeled at various time increments such as, but not limited to, 10 milliseconds, 20 milliseconds, 30 milliseconds, etc. up to a maximum deformation. A maximum deformation is, for example, probably about 120 milliseconds for a 40 mph 40% offset crash depicted in FIGS. 3 through 6.

Figure 2:
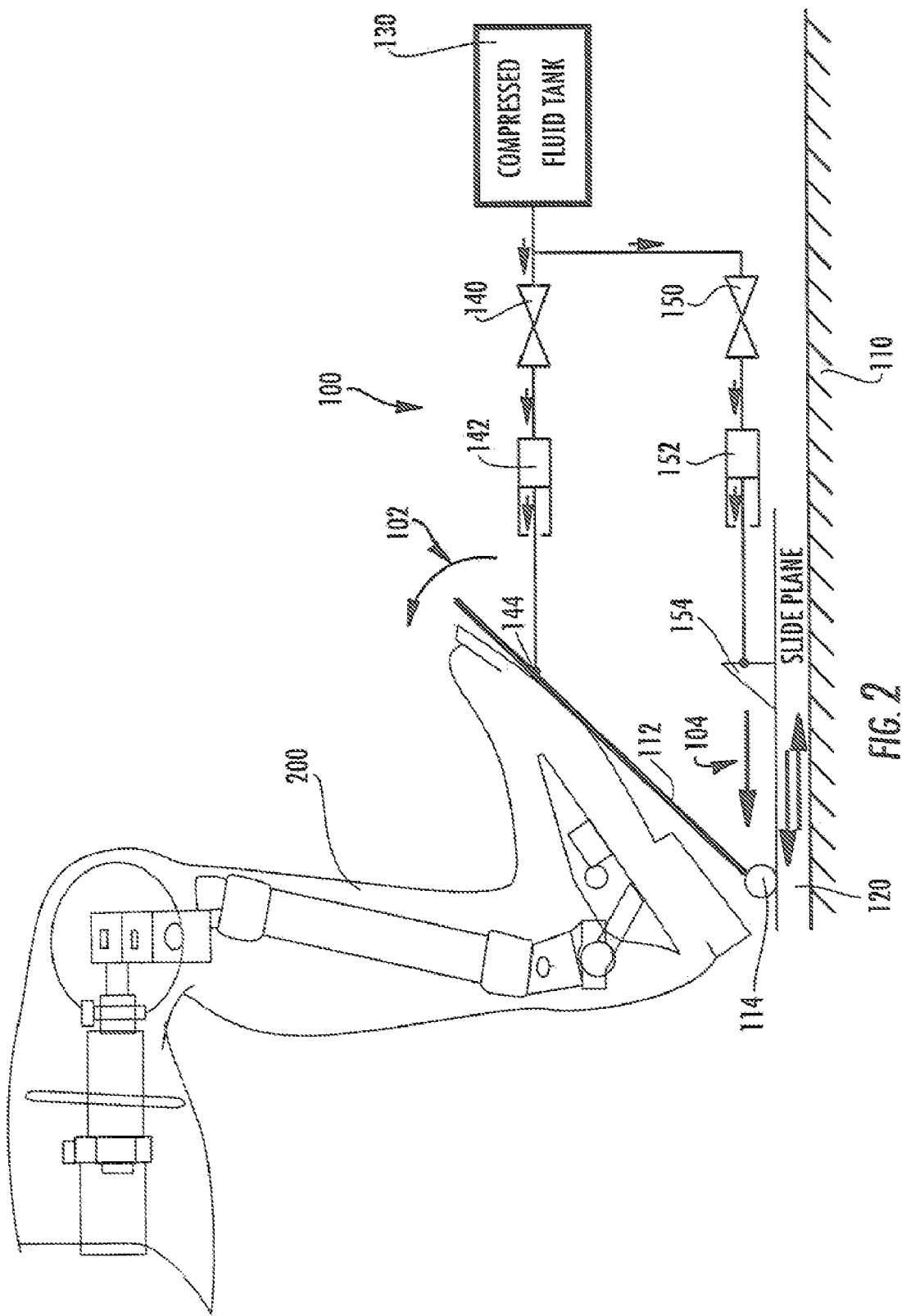
FIG. 2 is the schematic diagram of a system that enhances impact sled testing to enable more accurate lower leg injury criteria, further illustrating the placement of an instrumented test dummy on the footrest plane, used to measure lower leg accelerations, forces, and moments during the sled test.
Figure 3B:
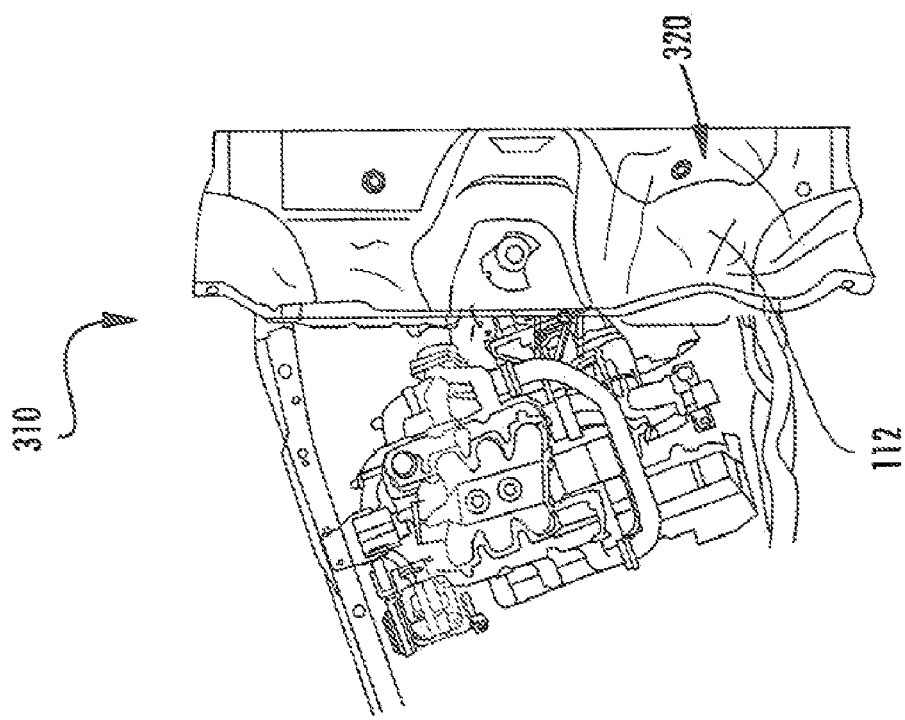
FIGS. 3a and 3b are both top planar views of the forward region, including the dash panel, of an automobile used in an impact test, shown in both original and deformed states, respectively, and further illustrating the impact to the footrest plane and the footwell region in a left-hand drive automobile after a forty percent partial overlap offset crash test.
Figure 3A:
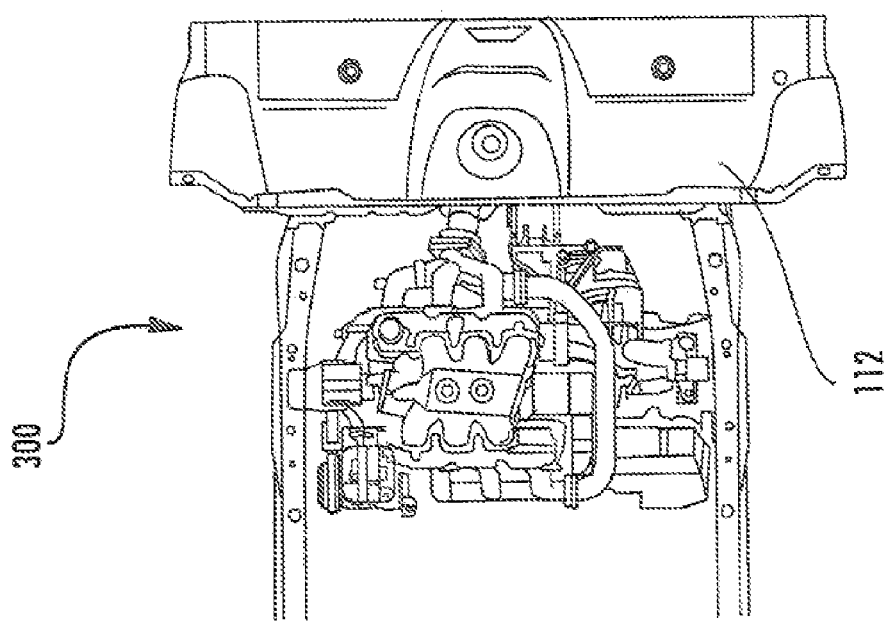
Figure 4B:
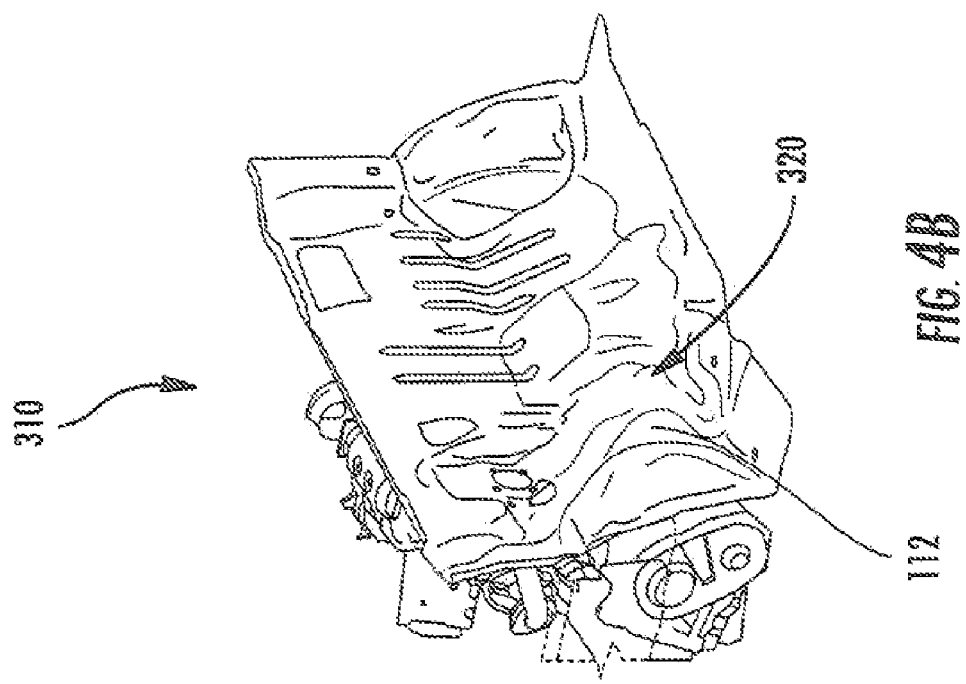
FIGS. 4a and 4b are both isometric views of the forward region, including the dash panel, of an automobile used in an impact test, shown in both original and deformed states, respectively, and further illustrating the impact to the footrest plane and the footwell region in a left-hand drive automobile after a forty percent partial overlap offset crash test.
Figure 4A:
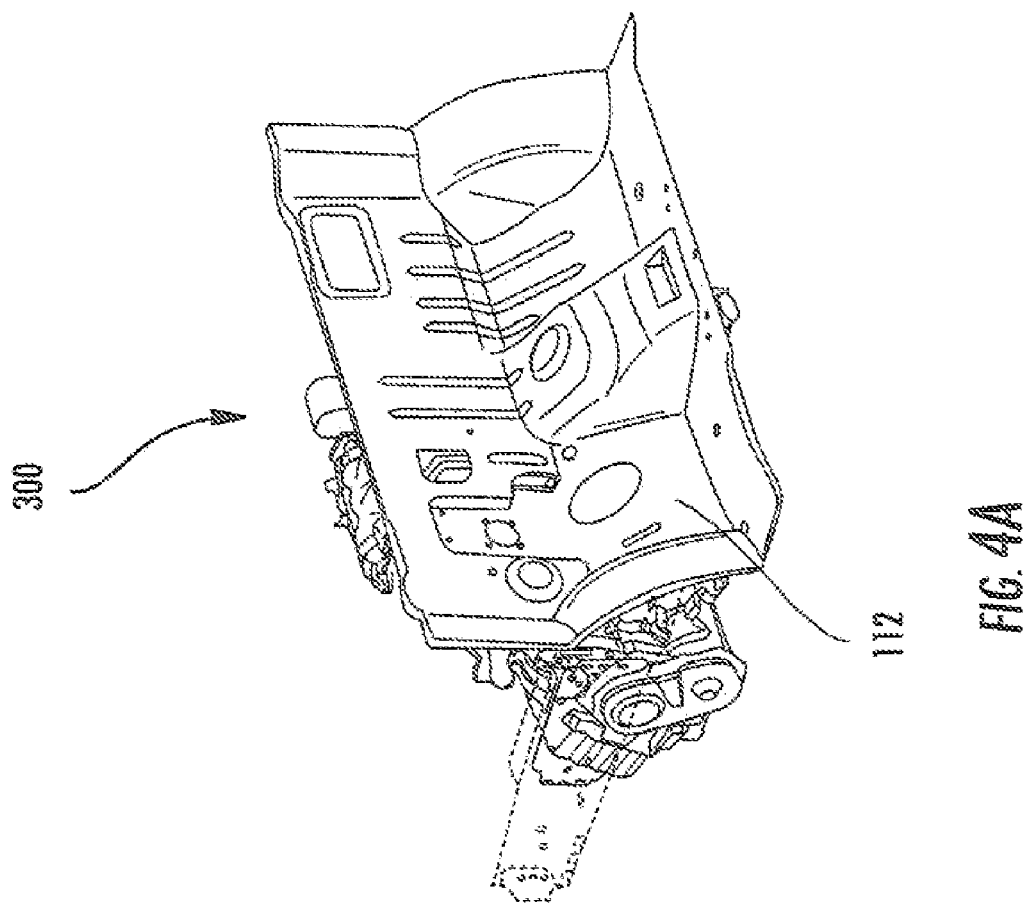

Referring now to FIG. 2, the footwell intrusion test system 100 of FIG. 1 is shown, additionally illustrating the placement of an instrumented test dummy 200 with its lower extremities placed on the footrest plane 112 in a sled impact test. The instrumented test dummy 200 used to measure lower leg accelerations, forces, and moments during the sled test on the sled buck 110. For example, when a rotational motion 102 is forced upon the footrest plane 112 by the first piston-cylinder 142, the toes of the instrumented test dummy 200 are pivoted upward about the ankle. Additionally, when a translational motion 104 is forced upon the footrest plane 112 by the second piston-cylinder 152 and the translational force block 154, the feet of the instrumented test dummy 200 are displaced rearward along a predetermined plane.

As the footwell intrusion test system 100 is used in combination with the instrumented test dummy 200, design and impact engineers are able to define vehicle parameters for optional crashworthiness. Parameters such as footrest location, footrest angle, instrument panel and kneeblocker placement, and maximum allowable footwell intrusion are definable. The system 100 will provide outputs such as the tibia index for lower leg evaluation and other ATD indicators used in traditional HYGE sled testing.

Referring now to FIGS. 3a-3b and FIGS. 4a-4b, the original state 300 and the deformed state 310 of the forward region, including the dash panel, of an automobile used in an impact test are shown. The original, undeformed, state 300 illustrates the forward region prior to a crash impact. The deformed state 310 illustrates the forward region after a crash impact. The footwell intrusion 320 resultant from the crash impact is shown. The crash impact shown, illustrates, for example, impact to the footrest plane 112 and the footwell region in a left-hand drive automobile after a forty percent offset crash test on the driver's side of the vehicle. The deformity to the footrest plane 112 in the deformed view 310 is measured by the instrumented test dummy 200 (as shown in FIG. 2), measuring lower leg accelerations, forces, and moments during the sled test. Additionally, knee motion, including interaction with the instrument panel, is measured.

Referring now to FIGS. 5a and 5b, the original state 300 and the deformed state 310 of an automobile powertrain and dash panel used in an impact test are shown. The deformed state 310 illustrates the powertrain and dash panel after a crash impact. The footwell intrusion 320 to the footrest plane 112, resultant from the crash impact, is shown. The crash impact shown, illustrates, for example, impact to the footrest plane 112 and the footwell region in a left-hand drive automobile after a forty percent offset crash test on the driver's side of the vehicle.

Referring now to FIG. 6, an overlay of the original state 300 and the deformed state 310 is shown. The overlay illustrates the actual movement, or impact, of the original front end structure 300 and the footrest plane 112 after footwell intrusion 320 has taken place. Thus, the magnitude of the footwell intrusion 320 is clearly visible as the deformed view 310 differentiates from the original view 300. The deformity to the footrest plane 112 in the deformed view 310 is measured by the instrumented test dummy 200 (as shown in FIG. 2), measuring lower leg accelerations, forces, and moments during the sled test.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A system for impact simulator testing in the footwell region of a vehicle to enable more accurate lower leg injury criteria measurements by generating footwell intrusion, comprising:
   a sled buck;
   a footrest plane located on the sled buck;
   a pivot hinge located at the base of the footrest plane and upon which the footrest plane pivots;
   a slide plane allowing horizontal motion on the floor of the sled buck;
   a compressed fluid tank;
   a first timer-released solenoid valve fluidly coupled to the compressed fluid tank;
   a second timer-released solenoid valve fluidly coupled to the compressed fluid tank;
   a first piston-cylinder fluidly coupled to the first timer-released solenoid valve;
   a second piston-cylinder fluidly coupled to the second timer-released solenoid valve;
   a translational force block, upon which, when actuated, the second piston-cylinder places a horizontal force, and with which the translational force block is moved horizontally into the footrest plane;
   wherein a rotational motion is generated by a fluid flow from the compressed fluid tank to the first piston-cylinder, being actuated by the first timer-released solenoid valve and moving horizontally into the footrest plane, thereby creating the rotational motion to the footrest plane; and
   wherein a translational motion is generated by a fluid flow from the compressed fluid tank to the second piston-cylinder, being actuated by the second timer-released solenoid valve and creating the translational motion by moving the translational force block horizontally along the slide plane to the footrest plane.

2. The system for impact simulator testing of claim 1, wherein the system is coupled to a hydraulically controlled, gas energized (HYGE) impact simulator sled test.

3. The system for impact simulator testing of claim 1, further comprising:
   an anthropomorphic test device;
   wherein the anthropomorphic test device is used to measure lower extremity accelerations, forces, and moments during the vehicle crash impact test.

4. The system for impact simulator testing of claim 1, further comprising:
   one or more stops, wherein the one or more stops control the magnitude of the motion simulating footwell intrusion;
   wherein the magnitude of the rotational motion applied to the footrest plane is stopped at a predetermined level, and
   wherein the magnitude of the translational motion applied to the footrest plane is stopped at a predetermined level.

5. The system for impact simulator testing of claim 1, wherein the compressed fluid tank is pressure adjusted such that a pressure level in the compressed fluid tank is adjusted to mimic the rate of footwell intrusion during an actual barrier crash.

6. The system for impact simulator testing of claim 1, wherein the first and second timer-released solenoid valves each are actuated at a unique undetermined time, to better mimic actual footwell intrusion.

7. The system for impact simulator testing of claim 1, wherein the first timer-released solenoid valve is further comprised of a first orifice, and the first orifice is adjustable, controlling the rate of mass transfer from the compressed fluid tank to the first piston-cylinder; and
   wherein the second timer-released solenoid valve is further comprised of a second orifice, and the second orifice is adjustable, controlling the rate of mass transfer from the compressed fluid tank to the second piston-cylinder.

8. A method for impact simulator testing in the footwell region of a vehicle to enable more accurate lower leg injury criteria measurements by generating footwell intrusion, comprising:
   providing a sled buck;
   providing a footrest plane, located on the sled buck;
   providing a pivot hinge, located at the base of the footrest plane and upon which the footrest plane pivots;
   providing a slide plane, allowing horizontal motion on the sled buck;
   providing a compressed fluid tank;
   providing a first timer-released solenoid valve fluidly coupled to the compressed fluid tank;
   providing a second timer-released solenoid valve fluidly coupled to the compressed fluid tank;
   providing a first piston-cylinder fluidly coupled to the first timer-released solenoid valve;
   providing a second piston-cylinder fluidly coupled to the second timer-released solenoid valve;
   providing a translational force block, upon which, when actuated, the second piston-cylinder places a horizontal force, and with which the translational force block thereby is moved horizontally into the footrest plane;
   wherein a rotational motion is generated by a fluid flow from the compressed fluid tank to the first piston-cylinder, being actuated by the first timer-released solenoid valve and moving horizontally into the footrest plane, thereby creating the rotational motion to the footrest plane; and
   wherein a translational motion is generated by a fluid flow from the compressed fluid tank to the second piston-cylinder, being actuated by the second timer-released solenoid valve and creating the translational motion by moving the translational force block horizontally along the slide plane to the footrest plane.

9. The method for impact simulator testing of claim 8, wherein the method for impact simulator testing in the footwell region is implemented in a hydraulically controlled, gas energized (HYGE) impact simulator sled test.

10. The method for impact simulator testing of claim 8, further comprising:
    providing an anthropomorphic test device; and
    wherein the anthropomorphic test device is used to measure lower extremity accelerations, forces, and moments during the vehicle crash impact test.

11. The method for impact simulator testing of claim 8, further comprising:
   providing one or more stops, wherein the one or more stops controls the magnitude of the motion simulating footwell intrusion;
   wherein the magnitude of the rotational motion applied to the footrest plane is stopped at a predetermined level, and
   wherein the magnitude of the translational motion applied to the footrest plane is stopped at a predetermined level.

12. The method for impact simulator testing of claim 8, wherein the compressed fluid tank is pressure adjusted such that a pressure level in the compressed fluid tank is adjusted to mimic the rate of footwell intrusion during an actual barrier crash.

13. The method for impact simulator testing of claim 8, wherein the first and second timer-released solenoid valves each are actuated at a unique predetermined time, to better mimic actual footwell intrusion.

14. The method for impact simulator testing of claim 8, wherein the first timer-released solenoid valve is further comprised of a first orifice, and the first orifice is adjustable, controlling the rate of mass transfer from the compressed fluid tank to the first piston-cylinder; and
   wherein the second timer-released solenoid valve is further comprised of a second orifice, and the second orifice is adjustable, controlling the rate of mass transfer from the compressed fluid tank to the second piston-cylinder.

15. A method for impact simulator testing in the footwell region of a vehicle to enable more accurate lower leg injury criteria measurements by generating footwell intrusion, comprising:
   providing a first actuation apparatus, wherein the first actuation apparatus selectively imparts a rotational motion; and
   providing a second actuation apparatus, wherein the second actuation apparatus selectively imparts a translation motion;
   wherein the rotational motion and the translational motion generate footwell intrusion in the footwell region of the vehicle.

* * * * *